(12) United States Patent
Jaeger et al.

(10) Patent No.: US 11,298,751 B2
(45) Date of Patent: Apr. 12, 2022

(54) ADJUSTABLE CARTRIDGE FOR BORING BAR

(71) Applicant: SECO TOOLS TOOLING SYSTEMS, Bouxwiller (FR)

(72) Inventors: Claude Jaeger, Monswiller (FR); Sebastien Hopfner, Thal Marmoutier (FR)

(73) Assignee: Seco Tools Tooling Systems, Bouxwiller (FR)

( * ) Notice: Subject to any disclaimer, the term of this patent is extended or adjusted under 35 U.S.C. 154(b) by 15 days.

(21) Appl. No.: 16/651,690

(22) PCT Filed: Sep. 28, 2018

(86) PCT No.: PCT/EP2018/076397
§ 371 (c)(1),
(2) Date: Mar. 27, 2020

(87) PCT Pub. No.: WO2019/063759
PCT Pub. Date: Apr. 4, 2019

(65) Prior Publication Data
US 2020/0261986 A1 Aug. 20, 2020

(30) Foreign Application Priority Data
Sep. 29, 2017 (FR) ........................ 1759132

(51) Int. Cl.
*B23B 29/034* (2006.01)
(52) U.S. Cl.
CPC ...... *B23B 29/03417* (2013.01); *B23B 29/034* (2013.01); *B23B 2260/038* (2013.01); *Y10T 408/8593* (2015.01)

(58) Field of Classification Search
CPC ............ B23B 29/034; B23B 29/03417; B23B 2260/038; Y10T 408/8593
See application file for complete search history.

(56) References Cited

U.S. PATENT DOCUMENTS 1,409,673 A * 3/1922 Colby ............... B23B 29/03417
408/171
3,755,868 A 9/1973 La Forge et al.
(Continued)

FOREIGN PATENT DOCUMENTS

DE 102011082964 A1 3/2013

*Primary Examiner* — Eric A. Gates
(74) *Attorney, Agent, or Firm* — Corinne R. Gorski (57) ABSTRACT

An adjustable cartridge for a boring bar includes a support structure including a surface for abutment with a peripheral area of a boring bar. A load-bearing structure mounts a cutting insert assembled to be movable in a first direction on the support structure. An adjustment mechanism is arranged to adjust the position of the load-bearing structure in relation to the support structure. The adjustment mechanism includes at least a first elastic means arranged to exert force against a first surface of the load-bearing structure, and an adjustment part disposed between the support structure and a second surface of the load-bearing structure and arranged to contact and to be movable in a second direction relative to the support structure and the load-bearing structure. The adjustment part has a surface that forms an acute angle with the second direction and is disposed in contact with a second surface of the load-bearing structure.

14 Claims, 7 Drawing Sheets

(56) References Cited

U.S. PATENT DOCUMENTS

| | | | |
|---|---|---|---|
| 3,853,422 | A | 12/1974 | Benjamin et al. |
| 4,544,309 | A | 10/1985 | Krstovic |
| 8,985,916 | B2 * | 3/2015 | Kocherovsky ........ B25B 23/142 408/154 |
| 9,782,832 | B1 * | 10/2017 | Lambrick ........... B23B 29/0341 |
| 10,076,790 | B2 * | 9/2018 | Marcelo Euripedes ..................... B23B 29/03417 |
| 2015/0306672 | A1 * | 10/2015 | Bassett ............... B23B 27/1681 407/88 |

* cited by examiner

ADJUSTABLE CARTRIDGE FOR BORING BAR

RELATED APPLICATION DATA

This application is a § 371 National Stage Application of PCT International Application No. PCT/EP2018/076397 filed Sep. 28, 2018 claiming priority to FR 1759132 filed Sep. 29, 2017.

BACKGROUND AND SUMMARY

This invention concerns the field of rotary tool holders and more specifically the field of devices for the assembly and adjustment of a cutting edge on a boring bar.

It is customary to create an assembly with a cutting edge on a boring bar using a cartridge that holds the cutting edge and that includes an arrangement that allows the cartridge to be mounted on the end of the bar, so that the edge of the insert is positioned to project beyond the edge of the boring bar.

For cutting operations that have to be conducted with precision, it is desirable to perform the assembly and positional adjustment of the cutting edge on the boring bar with meticulous accuracy.

A known solution to allow for this adjustable assembly of the cutting edge on the boring bar relies on the use, firstly, of a cartridge that includes a point for the attachment of the cartridge to the boring bar that is positioned at some distance from the cutting edge and, secondly, a means of actuation like a cam or displacement spindle so that the cartridge pivots or has its shape bent under the effect of the means of actuation positioned within the adjustment plane.

However, it should be noted that this solution for the adjustment of the position of the cutting edge relies on the displacement of the insert along a line of travel that forms a curve. Yet, due to the curve, the adjustment of an edge along such a line of travel prevents any strictly rectilinear displacement of the cutting edge along an axis radial in relation to the boring bar. Indeed, the curve in the line of travel of the cutting edge has the disadvantage of requiring a modification in the position of the cutting edge about an axis that extends radially in relation to the boring bar together with a modification of the position of the cutting edge in relation to the axis of the boring bar.

This invention has the particular object of offsetting this disadvantage by providing a cartridge that allows for the micrometric adjustment of the position of the edge of the insert along the radial axis of the boring bar, regardless of this position along the axis of the boring bar.

Objects of the invention can be achieved according to an aspect of the invention in which an adjustable cartridge for a boring bar is provided including:

a support structure including a surface for abutment with a peripheral area of a boring bar;

a load-bearing structure for a cutting insert assembled to be movable translationally in a first direction on the support structure, characterized in that the cartridge includes:

a mechanism to adjust the position of the load-bearing structure in relation to the support structure, the adjustment mechanism including at least a first elastic means arranged to exert force against a first surface of the load-bearing structure, and an adjustment part disposed between the support structure and a second surface of the load-bearing structure and arranged to contact and to be movable translationally in a second direction relative to the support structure and the load-bearing structure, the adjustment part having a surface forming an acute angle with the second direction and being disposed in contact with a second surface of the load-bearing structure, the first surface and the second surface of the load-bearing structure facing in generally opposite directions.

As earlier explained, the first elastic means are arranged to exert force against the first surface of the load-bearing structure. The first surface is preferably a peripheral surface facing outwardly away from the load-bearing structure in the first direction. Thanks to this, assembling of the first elastic means is facilitated.

BRIEF DESCRIPTION OF THE DRAWINGS

The invention will be better understood thanks to the description below, which relates to a preferred embodiment, provided as a non-exclusive example and explained with reference to the schematic drawings appended, in which:

FIG. 7bis is a schematic depiction of an example of the assembly of another type of cartridge according to the invention on a boring bar;

FIG. 8bis is a schematic depiction of an example of the assembly of another type of cartridge according to the invention in cross-section from a viewing angle parallel to the plane of the cutting insert;

DETAILED DESCRIPTION

Figure 1:
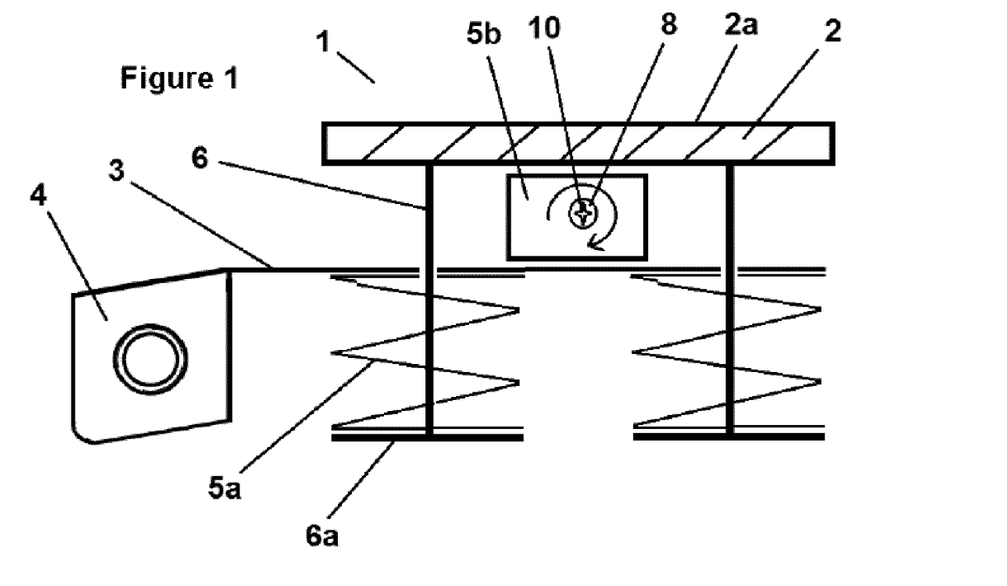
FIG. 1 is a schematic depiction of an example of the construction of a cartridge in cross-section within the displacement plane of the cutting edge.
Figure 2:
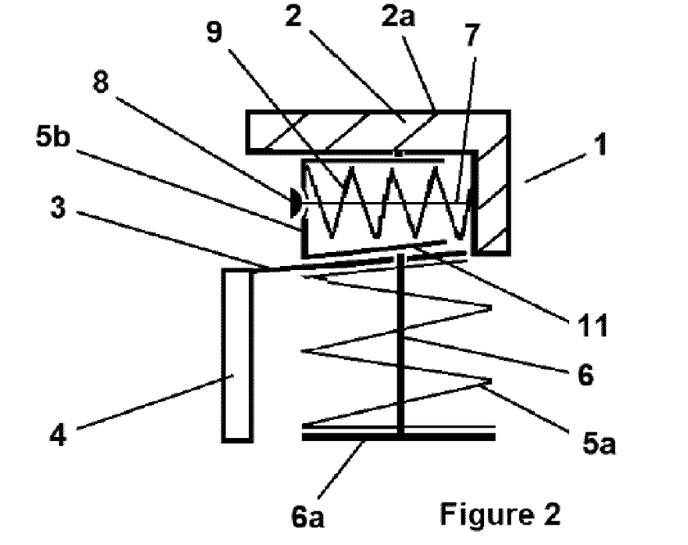
FIG. 2 is a schematic depiction of an example of the construction of a cartridge from a side view.
Figure 3:
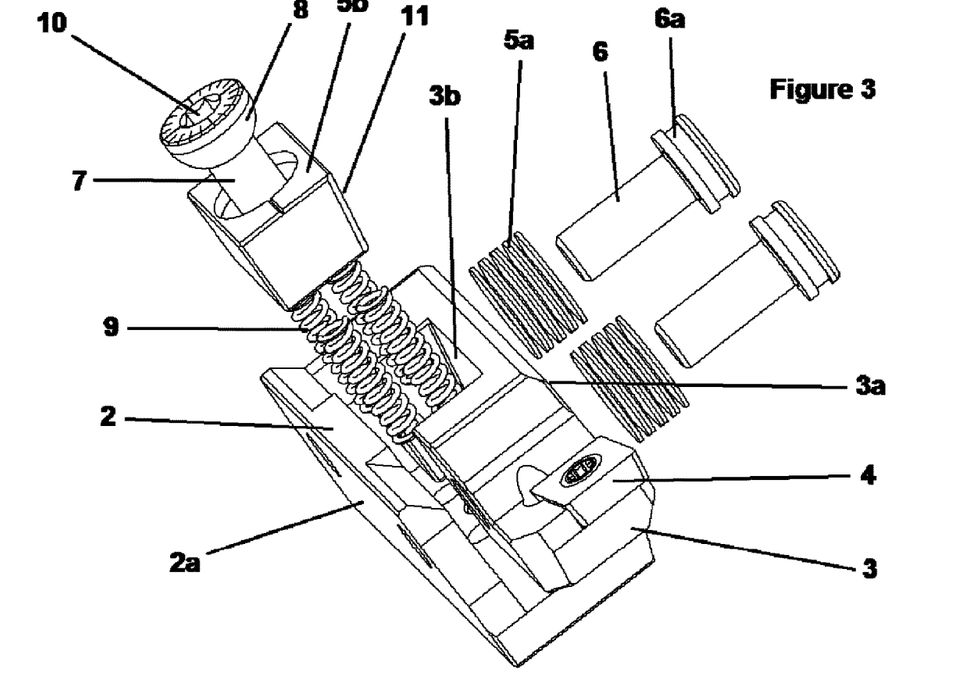
FIG. 3 is an exploded schematic depiction of the different parts of an example of a cartridge according to the invention.

A micrometrically adjustable cartridge 1 for boring equipment according to an aspect of the invention is seen schematically in FIGS. 1 and 2 and in perspective in FIG. 3. The cartridge 1 includes a support structure 2 including a surface 2a for abutting a peripheral area of a boring bar 13 (FIGS. 7 and 7bis), a load-bearing structure 3 on which a cutting insert 4 is adapted to be mounted, the load-bearing structure being movable in translation in a first direction on the support structure 2, and a mechanism to adjust the position of the load-bearing structure 3 in relation to the support structure 2, the adjustment mechanism including at least a first elastic means, typically a spring 5a, exerting force against a first surface 3a of the load-bearing structure 3, and an adjustment part, typically a wedge 5b, disposed between the support structure 2 and a second surface 3b of the load-bearing structure 3 and arranged to contact and to be movable in translation in a second direction relative to the support structure 2 and the load-bearing structure, the wedge 5b having a surface 11 forming an acute angle with the second direction and being disposed in contact with the second surface 3b of the load-bearing structure 3, the first surface 3a and the second surface 3b of the load-bearing structure facing in generally opposite directions as will be seen, for example, in FIG. 3.

The adjustment mechanism in the cartridge 1 is positioned, at least as regards a portion formed by the wedge 5b, between the support structure 2 and the load-bearing structure 3 for the insert 4, so that the position of the load-bearing structure 3 for the insert 4 in relation to the support structure 2 can be adjusted via movement of the wedge 5b. This wedge 5b helps to control the deviation of the load-bearing structure 3 in relation to the support structure 2, and therefore to the boring bar 13 when that support structure 2 is assembled on the edge of a boring bar 13.

Figure 4:
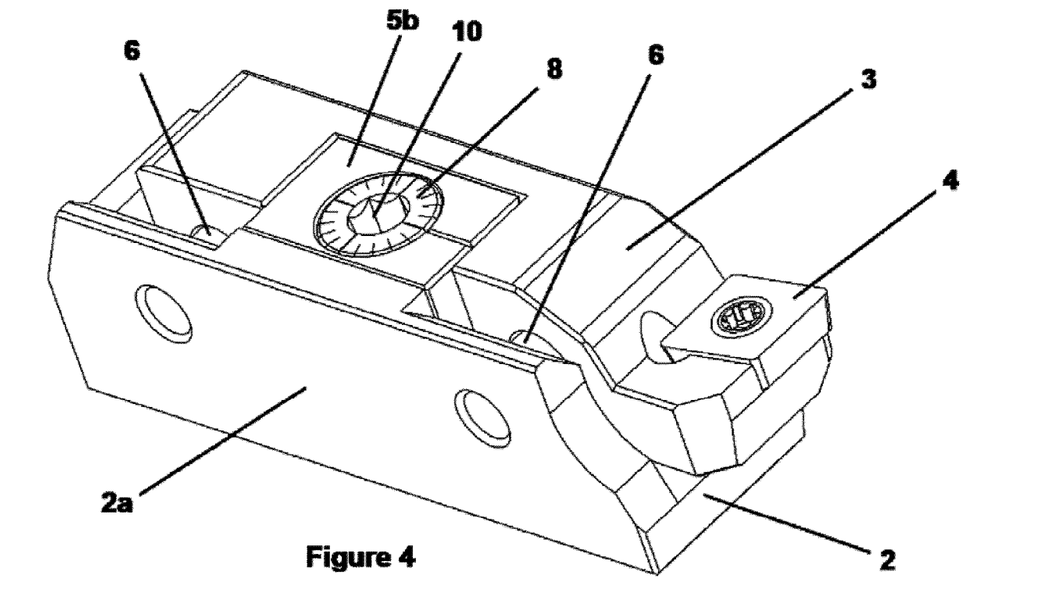
FIG. 4 is a schematic depiction of an assembly of the different parts of an example of a cartridge according to the invention.
Figure 5:
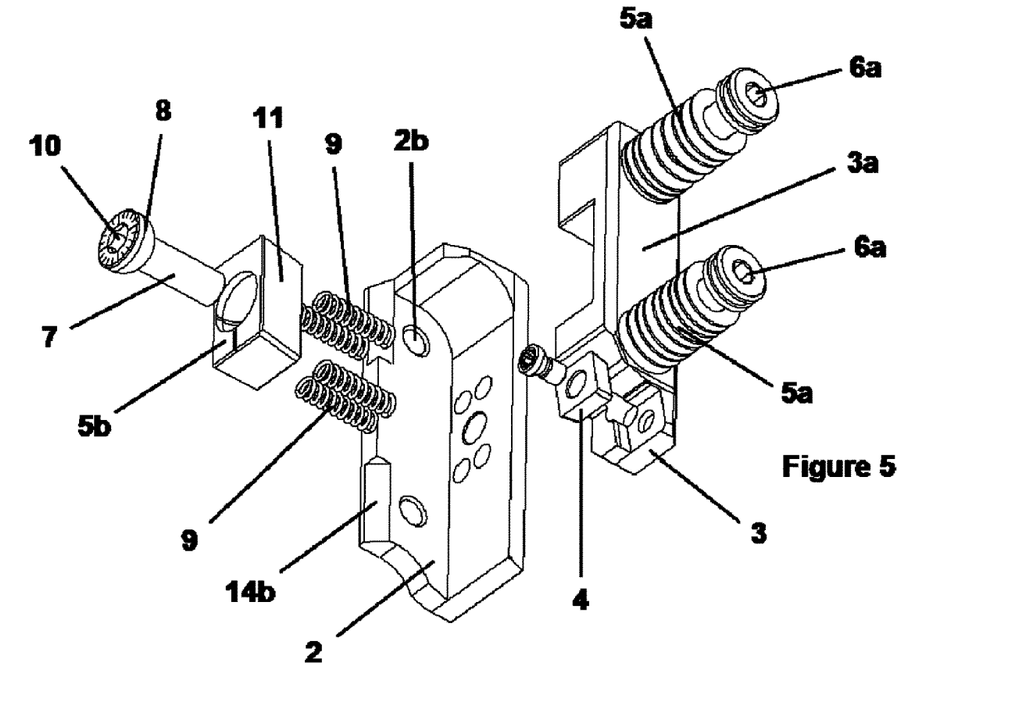
FIG. 5 is an exploded schematic depiction of the different parts of an example of a cartridge according to the invention from a second viewing angle.
Figure 7:
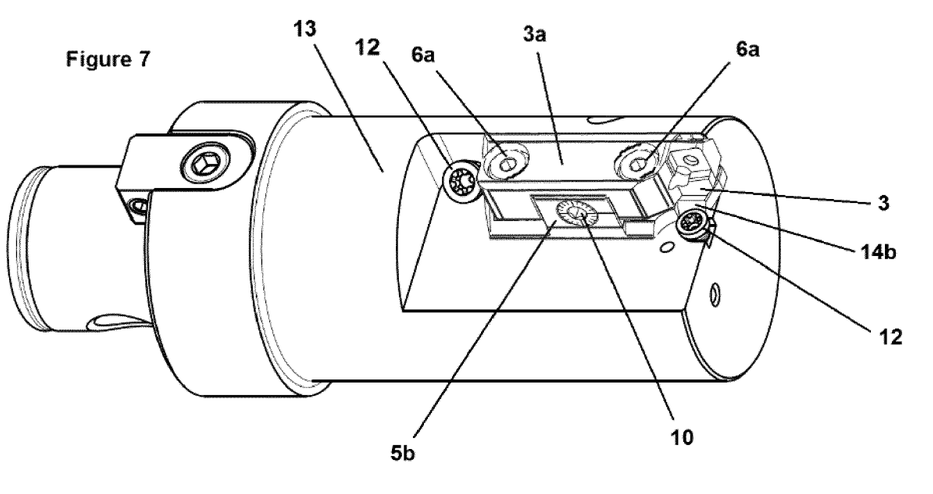
FIG. 7 is a schematic depiction of an example of the assembly of a cartridge according to the invention on a boring bar.

According to one construction feature, the cartridge 1 is preferably characterized in that, according to a side view of the cartridge 1, the support structure 2 includes an L-shaped section as seen in, for example, FIGS. 3-5, so that the external face of a first branch of the "L" has an area forming a surface 2a for abutting with a boring bar 13 (as seen in FIGS. 7 and 7bis) and a second branch of the "L" creates an assembly surface for supporting a surface of the wedge 5b facing in a generally opposite direction from the surface 11, as will be appreciated from, for example, FIGS. 1-5.

Thus, the cartridge 1 is preferably constructed so that the support structure 2 is built in an elongated shape that has a section that is approximately L-shaped. As will be appreciated from, e.g., FIGS. 1-3 and 5-6, the load-bearing structure 3 for the insert 4 is mounted to be movable inside the body formed by the two branches of the "L" shape of the support structure 2. At least one of the external faces of this support structure 2, preferably the first branch of the "L" is adapted so as to interact with at least one peripheral area of a boring bar 13.

Figure 6:
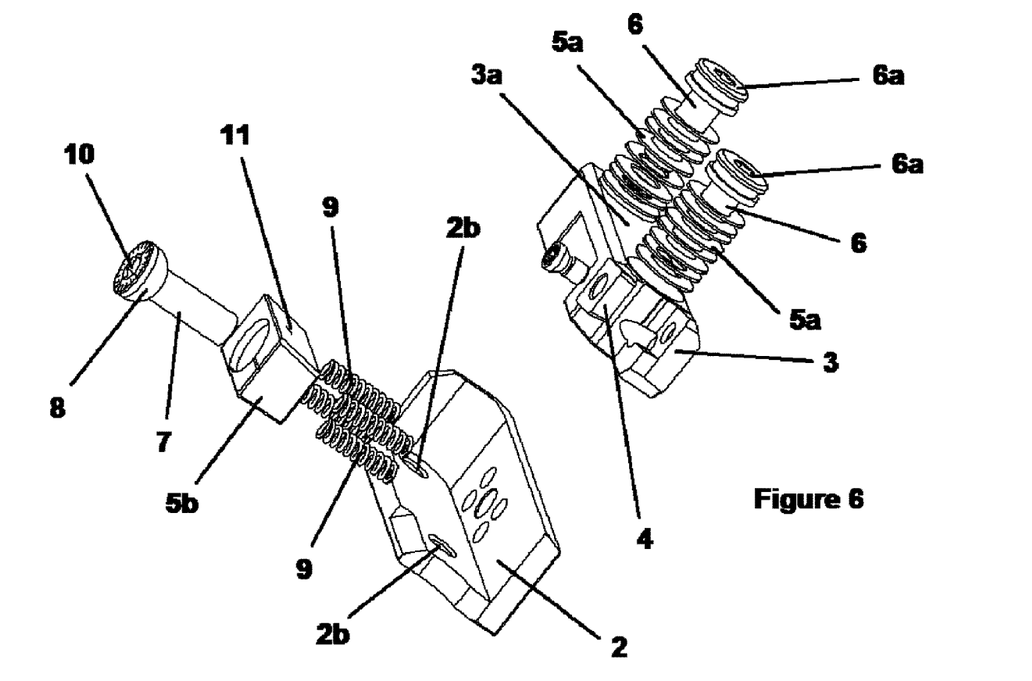
FIG. 6 is an exploded schematic depiction of the different parts of an example of a cartridge according to the invention from a third viewing angle.

As seen in, for example, FIGS. 5 and 6, on an internal face of the support structure 2, the first branch of "L"-shape of the support structure 2 can include a structure such as a threaded hole 2b that holds at least one axial element of translation, such as a threaded bolt 6 or screw, of the load-bearing structure 3 of an insert 4. A bolt 6 will ordinarily extend through a through-hole in the load-bearing structure 3. Thus, as the external face of that first branch of the "L"-shape of the support structure 2 is intended to abut against the peripheral area of a boring bar 13, the translational movement of the load-bearing structure 3 for the insert 4 along the bolt 6 allows for the adjustment of the load-bearing structure 3 in relation to the boring bar 13 and therefore the adjustment of the cutting operation by the insert 4. Preferably, the support structure 2 is L-shaped when seen in any section through a sub-surface of the first branch of "L"-shape, which sub-surface of the first branch of "L"-shape is intended and/or arranged to be in contact with the surface 11 of the adjustment part 5b when the cartridge 1 is assembled, and perpendicular to a longitudinal axis of the support structure 2. Thanks to this, the support structure 2 is simplified and easy to manufacture. The assembling of the parts of the cartridge 1 is also facilitated. Preferably, the support structure 2 is L-shaped, when seen in any section perpendicular to the longitudinal axis of the support structure 2, at least along a major part of the length of the support structure 2 and/or along a major part of the first branch of "L"-shape.

The second branch of the "L"-shape can include a surface with a structure such as a threaded hole designed to interact with at least one part of the adjustment mechanism, specifically at least one axial element of translation, such as a threaded bolt 7 or screw, for the wedge 5b. The bolt 7 will ordinarily extend through a through-hole in the wedge 5b and is arranged co-operate with the threaded hole in the second branch of the "L"-shape.

The load-bearing structure 3 and the wedge 5b are therefore assembled, respectively, so that each is able to move translationally along at least one section of a corresponding axial element of translation, e.g., bolt or screw 6, 7.

The respective bolts 6, 7 for the load-bearing structure 3 and the wedge 5b are preferably arranged along axes approximately parallel to each of the branches of the "L"-shape of the load-bearing structure 3, meaning that, from a side view of the cartridge 1 according to the invention, the axes of these bolts 6, 7 intersect, as will be appreciated from, for example, FIG. 2.

According to a preferred, but not exclusive, construction method for the invention, as will be appreciated from, for example, FIGS. 1-5, the load-bearing structure 3 is adapted to slide along at least one axial element, i.e. bolt 6, having a thrust bearing, i.e. head 6a, and is adapted to be mounted on the support structure 2, the load-bearing structure 3 interacting with at least one elastic means, e.g., spring 5a, positioned between the load-bearing structure 3 and the thrust bearing, i.e. the head 6a of the bolt 6, so that the load-bearing structure 3 is urged toward the support structure 2. The thrust bearing, i.e. the head 6a, permits rotation of the axial element, i.e. the bolt 6, around a longitudinal axis of the axial element in relation to the load bearing structure 3, and it urges the load-bearing structure 3 toward the support structure 2 via the elastic means, i.e. the spring 5a. By limiting the movement of the load-bearing structure 3 along the at least one bolt 6, the insert 4 can be displaced along a straight line, instead of along a curve, so that displacement of the insert in one direction does not also lead to displacement in another direction.

The positional adjustment mechanism of the load-bearing structure 3 ordinarily comprises the spring 5a and the wedge 5b, these being arranged on opposite sides of the load-bearing structure 3, so that the load-bearing structure 3 is kept pressed against the wedge 5b by the spring 5a. The spring 5a is positioned between a head 6a that is fixed, at least in translation, vis-à-vis the support structure 2 and, secondly, a first surface 3a of the load-bearing structure 3.

According to one construction feature, the elastic means, i.e. the spring 5a positioned between the load-bearing structure 3 and the thrust-bearing 6a of the bolt 6 includes at least one Belleville spring washer.

According to one construction feature, the load-bearing structure 3 is assembled slidingly along a pair of axial elements of translation, i.e. bolts 6, assembled parallel to one another. The construction of a mechanism to guide the translation of the load-bearing structure 3 along the pair of bolts 6 allows one to eliminate the risks of unwanted pivoting that might occur when the load-bearing structure 3 is mounted on a single axial element, i.e. bolt. Each bolt 6 also includes a head 6a and is combined with a dedicated spring 5a. Additionally but not exclusively, the bolt 7 that guides the translation of the wedge 5b is arranged in order to position the wedge 5b between the two bolts 6 parallel to the load-bearing structure 3. In this manner, the stress exerted by the wedge 5b on the load-bearing structure 3 is balanced in relation to the pressure exerted respectively by the spring 5a associated with these parallel bolts 6.

When seen in the second direction, as for example in FIG. 1, the surface 11 of the adjustment part 5b is entirely positioned between the two axial elements of translation, i.e. the bolts 6, and the elastic means 5a associated to the respective axial element of translation. Thanks to this, a simplified design of the cartridge can be achieved and the size of the cartridge can be decreased. This is also facilitating a more trouble-free translational movement of the load-bearing structure 3. Preferably, the surface 11 of the adjustment part 5b is centrally positioned between the two axial elements of translation, i.e. the bolts 6, when seen in the second direction.

The load-bearing structure 3 interacts with the wedge 5b in a second surface 3b. The first 3a and second 3b areas of the load-bearing structure 3 are therefore created by opposing faces of the load-bearing structure 3. The abutment between the load-bearing structure 3 and the wedge 5b through this second surface 3b is created in the form of an adjustment gradient 11, so that the translation of the wedge 5b along its bolt 7 causes a displacement of the load-bearing structure 3 in translation along its own bolt 6. The adjustment gradient 11 is then created within a plane that forms an angle in relation to the respective axes of the different axial elements of translation, i.e. the bolts 6, 7.

According to one construction feature, the bolt 6 that helps to guide the load-bearing structure 3 is created by a screw whose head forms the head 6a against which the spring 5a abuts. The creation of this bolt 6 in the form of a screw one of whose ends is inserted in a dedicated orifice 2b in the support structure 2, allows for a mechanism to adjust the position of the head 6a and therefore the stress exerted on the spring 5a. This stress on the spring 5a is also passed on to the load-bearing structure 3 that abuts the gradient 11 of the wedge 5b.

According to one construction feature, the wedge 5b is assembled to be movable in translation on the support structure 2 along an axis perpendicular to the displacement axis of the load-bearing structure 3. Thus, from a side view of the cartridge 1, the respective translation axes of the support structure 2 and of the load-bearing structure 3 are arranged perpendicularly to one another. According to a preferred embodiment connected to this construction feature, the two branches of the "L"-shaped section of the support structure 2 are also arranged so as to be perpendicular to one another.

According to one construction feature, the adjustment part, i.e. the wedge 5b, is mounted on the support structure 2 by means of a threaded pin that goes through the wedge 5b. The adjustment part, i.e. the wedge 5b, is wedged between the support structure 2 and the second surface 3b of the load-bearing structure 3 by an adjustment part clamping means 8, e.g. head 8 of the threaded pin. In the shown embodiments, the adjustment part clamping means 8, i.e. the head 8, is preferably integrated with the threaded pin, i.e. the bolt 7. Other adjustment part clamping means, also not being a part of the threaded pin, are possible to use. This threaded pin may be mounted parallel to the bolt 7 that guides the translation of the wedge 5b or alternatively, and ordinarily, this threaded pin is the bolt 7. In the embodiment illustrated in the figures, the threaded pin that mounts the wedge 5b on the support structure also functions as the axial element of translation that guides the movement of the wedge 5b in the second direction.

According to one specific element of this construction feature, the threaded pin 7 includes a first threaded end that interacts with the support structure 2 via a threaded boring in the support structure 2. The threaded pin 7 includes as well a thrust bearing, e.g. head 8, positioned at the second end of the threaded pin 7. The thrust bearing, i.e. the head 8, interacts with a first face of the adjustment part, i.e. a first face of the wedge 5b, in order to propel its displacement in the second direction, i.e. in the direction of the longitudinal axis of the threaded pin 7. The thrust bearing, i.e. the head 8, is an adjustment part clamping means, that wedges the adjustment part, i.e. the wedge 5b, between the support structure 2 and the second surface 3b of the load-bearing structure 3.

According to an additional specific element, the cartridge 1 is characterized in that the wedge 5b is mounted under stress between, firstly, a head 8 held by the threaded pin 7 and, secondly, a second elastic means, e.g., spring 9, abutting an area of the support structure 2. Thus, this second elastic means 9, i.e. the second spring 9, abutting the surface of the support structure 2, exerts pressure against a second face of the wedge 5b so that the wedge 5b is kept pressurised against the head 8 of the threaded pin 7. Preferentially, this spring 9 abutting a surface of the support structure 2 comprises at least one spring. The second face of the wedge 5b, on which the second spring 9 exerts pressure, and the first face of the wedge 5b interacting with the thrust bearing, i.e. the head 8, are facing in generally opposite directions.

According to an additional characteristic, the head 8 includes an operating surface allowing the axial rotation of the threaded pin 7 and the joint movement of the head 8 that displace the wedge 5b in translation. This operating surface may, for example, take the form of a cooperative surface 10 with a tool, for example an underside of the bolt or screw head. Additionally and as an example, the screw head may include a scale intended to specify the scale of the axial rotation of the threaded pin 7 and of the displacement of the wedge 5b.

During the construction of the cartridge 1, the thread pitch of the threaded pin 7 and the slope of the gradient 11 between the wedge 5b and the load-bearing structure 3 are set in order to optimise the finesse of the displacement of the wedge 5b and therefore the position of the load-bearing structure 3 and the cutting edge 4.

According to another construction feature, the threaded pin 7 passes through the wedge 5b. The threaded pin 7 is mounted by its end freely in rotation and fixed in axial translation vis-à-vis the support structure 2. Thus, with the wedge 5b arranged so as to be blocked in rotation, the axial rotation of the threaded pin 7 causes the translation of the wedge 5b.

As earlier explained, the threaded pin 7 may be the bolt 7 comprised in the adjustment mechanism. The bolt 7 will ordinarily extend through a through-hole in the wedge 5b and is arranged to co-operate with the threaded hole in the second branch of the "L"-shape. This arrangement of the threaded hole in the second branch of the "L"-shape is beneficial because said threaded hole is positioned further away from a chip room of the boring bar, which chip room is associated with the cartridge 1, and due to that is less exposed to contamination by dust. The threads of the bolt 7 and the threads in the threaded hole in the second branch of the "L"-shape can be right handed or left handed. If the threads are right handed, an axial rotation of the bolt 7 in a clockwise direction, i.e. screwing of the bolt 7, will cause the wedge 5$b$ to move further in between the support structure 2 and the load-bearing structure 3. Upon an axial rotation of the bolt 7 in a counterclockwise direction, i.e. upon unscrewing of the bolt 7, the wedge 5$b$ will move in the opposite direction as a result of the elastic means 9 exerting pressure against the second face of the wedge 5$b$ so that the wedge 5$b$ is kept pressurised against the head 8 of the bolt 7.

Figure 11:
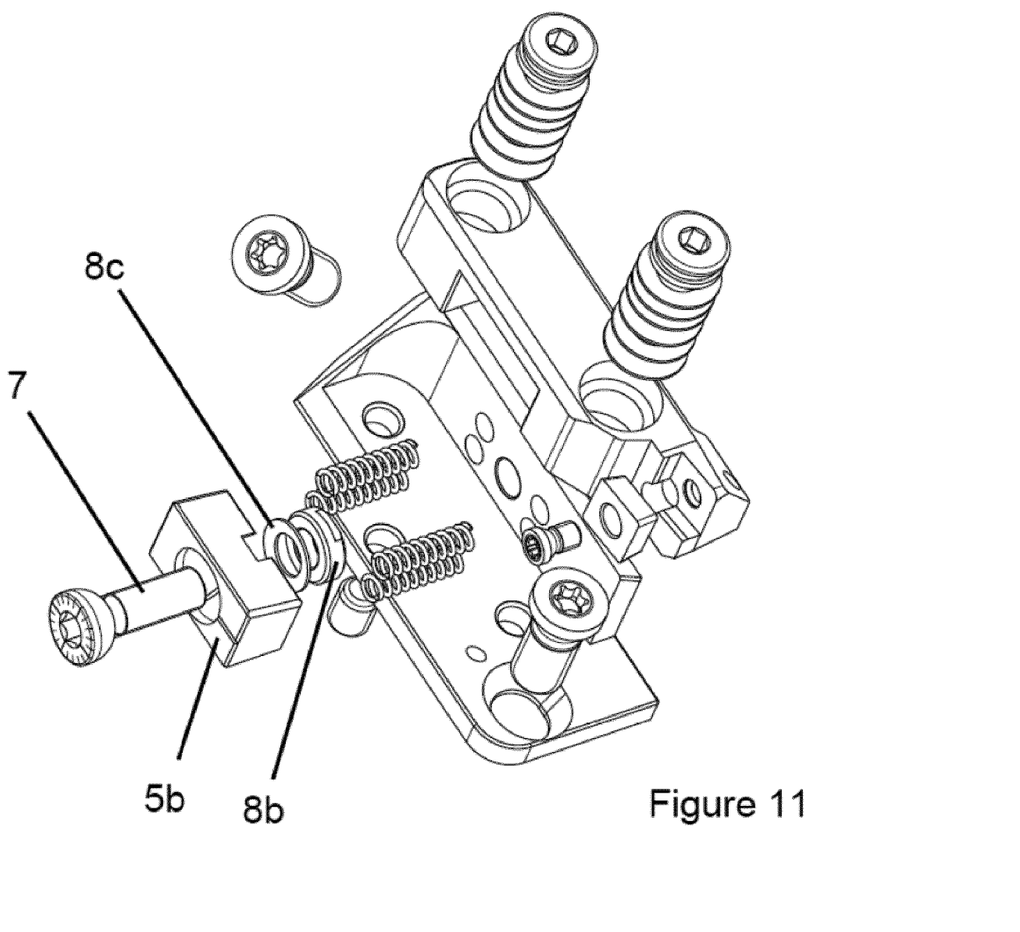
FIG. 11 is an exploded depiction of a further type of cartridge according to one embodiment of the invention.
Figure 12:
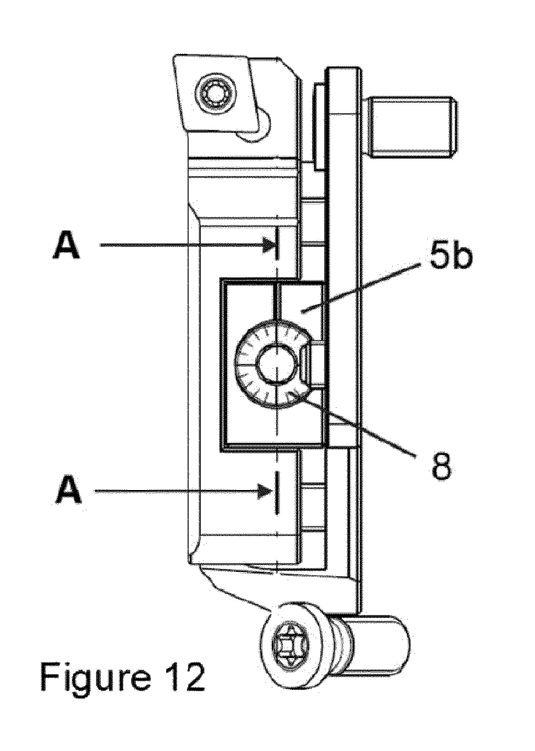
FIG. 12 is a view of the cartridge according to FIG. 11.
Figure 13:
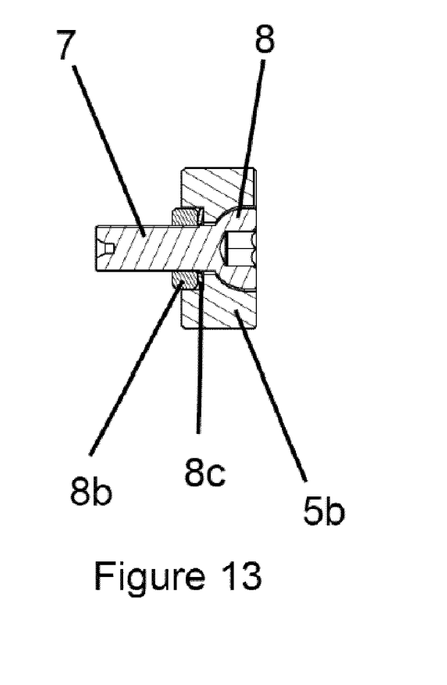
FIG. 13 is a cross-sectional view of the wedge 5b and the bolt 7 of the cartridge in FIG. 12 along the cross-section A-A.

According to one construction feature, the bolt 7 may be provided with a bushing 8$b$ as shown in figure FIGS. 11-13. The bushing 8$b$ is arranged such that it permits rotation of the bolt 7 around a longitudinal axis of the bolt 7 inside the wedge 5$b$ but it prevents the bolt 7 from axial movement out of the wedge 5$b$. Preferably, the bushing 8$b$ is arranged such that it permits rotation of the bolt 7 around the longitudinal axis of the bolt 7 inside the wedge 5$b$ but it prevents the bolt 7 from axial movement relative the wedge 5$b$ during unscrewing of the bolt 7. Thanks to this arrangement, the wedge 5$b$ can be moved translationally upon unscrewing the bolt 7 even if the force or forces from the elastic means 9 is/are not large enough to overcome the friction forces between the wedge 5$b$ and the load-bearing structure 3 respective the support structure 2. If the bolt 7 is arranged with the bushing 8$b$ in the described way, a presence of the elastic means 9 are still preferable. Thanks to this arrangement comprising the bushing 8$b$, the cartridge can be simplified, the size of the cartridge can be decreased and the cartridge is less sensitive to dust, high temperatures and vibrations. Preferably, a washer 8$c$ is provided between the bushing 8$b$ and the wedge 5$b$ to make the connection more secure and/or to eliminate the axial play of the bolt 7 relative the wedge 5$b$. Preferably, the bushing 8$b$ is provided with threads that co-operate with the threads on the bolt 7, which facilitate mounting of the bushing 8$b$. The bushing 8$b$ can comprise further mounting means for mounting of the bushing 8$b$ on the bolt 7 and the wedge 5$b$.

According to one construction feature, the second branch of the "L"-shape of the support structure 2 viewed in cross-section may also create a surface for the load-bearing structure 3 to slide in translation. According to this construction, the load-bearing structure 3 is, firstly, mounted slidingly along an bolt 6 that is specific to it and that guides its displacement and, secondly, abuts a surface formed by the second branch of the "L"-shape of the support structure 2 and on which the load-bearing structure 3 may slide depending on its adjustment by the wedge 5$b$.

According to an alternative construction, the load-bearing structure 3 is mounted on the support structure 2 slidingly along a rail (not shown) that forms an axial element of translation held by the second branch of the "L"-shape of the support structure 2.

The second branch of the "L"-shape of the support structure 2 of the cartridge 1 can be arranged so as to be positioned within a plane parallel to a plane passing through the rotational axis of the boring bar 13 designed to take the cartridge 1. As the bolt 6 to guide the translation of the load-bearing structure 3 is arranged parallel to this second branch of the "L"-shape of the support structure 2, from a side view of the cartridge 1, the translation of the load-bearing structure 3 along this bolt 6 thereby allows for an adjustment in the position of the load-bearing structure 3 in relation to the rotational axis of the boring bar 13.

According to a specific element of this construction feature, the cutting edge 4 held by the load-bearing structure 3 is positioned within a plane passing through the rotational axis of the boring bar 13 so that the adjustment in the position of the load-bearing structure 3 allows the cutting edge 4 to be adjusted in relation to the rotational axis of the boring bar 13.

According to one construction feature, the portion of the load-bearing structure 3 supporting the cutting insert 4 is positioned to overhang the support structure 2 and particularly the second branch of the "L"-shape of the support structure 2.

Alternatively and preferentially, the portion of the load-bearing structure 3 that supports the cutting insert 4 is in contact with the second branch of the "L"-shape of the support structure 2. The portion of the load-bearing structure 3 that supports the insert 4 is then able to slide against the second branch of the "L"-shape of the support structure 2 during adjustment of the position of the cutting insert 4. Furthermore, this position supporting the load-bearing structure 3 against the second branch of the support structure 2, prevents the force exerted on the cutting insert 4 from causing a shift in the load-bearing structure 3 and an unwanted displacement of the wedge 5$b$.

Figure 8:
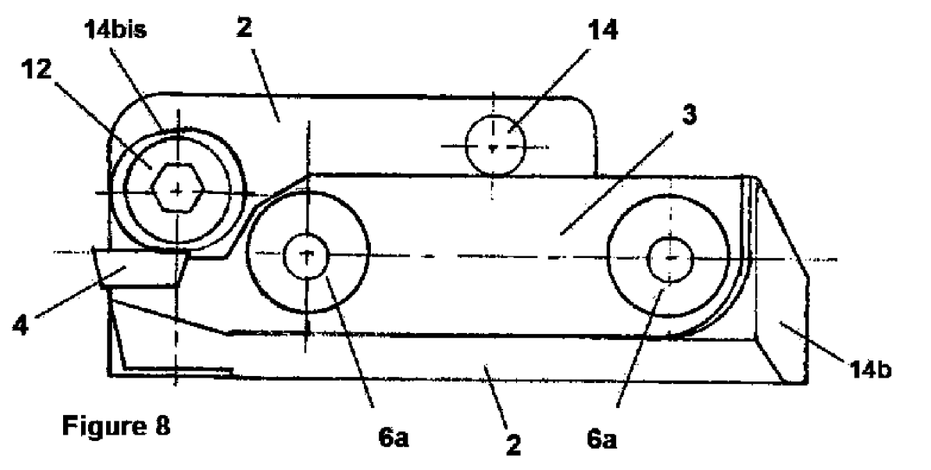
FIG. 8 is a schematic depiction of an example of the assembly of a cartridge in cross-section from a viewing angle parallel to the plane of the cutting insert.
Figure 9:
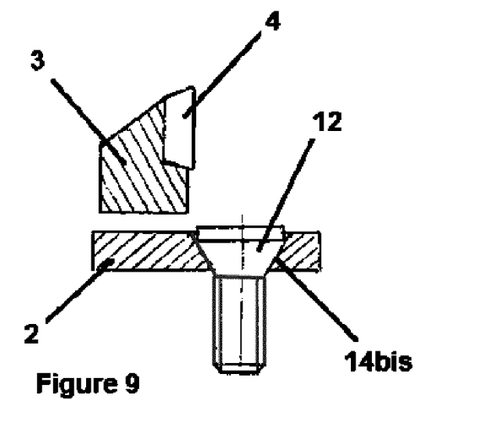
FIG. 9 is a schematic depiction of a cross-section of a means of attachment and the cutting insert in an example of the assembly of a cartridge according to either FIG. 7 or FIG. 8.

According to another construction feature seen, for example, in FIG. 8$bis$, the surface of the portion of the load-bearing structure 3 of the cutting insert 4 that is situated on a face of the load-bearing structure 3 generally opposite the one holding the insert 4 creates a flange 3$c$ arranged so as to cooperate with the second branch of the "L"-shape of the support structure 2. That flange 3$c$ takes the structural form of a load-bearing structure 3 with a greater thickness in its portion holding the insert 4 compared to a thickness of a portion of the load-bearing structure 3 in sliding contact with the second branch of the "L"-shape of the support structure 2. In addition, this flange 3$c$ has a complementarity of form with an edge of the second branch of the "L"-shape at an end of the support structure 2 so as to allow the load-bearing structure 3 to slide against the second branch of the "L"-shape of the support structure 2 when the adjustment mechanism is put into action. The flange 3$c$ of the load-bearing structure 3 of the cutting insert 4 abuts with the end of the support structure 2 and, during a cutting operation, forces borne by the cutting insert 4 are transmitted to the flange 3$c$, so that the end of the support structure 2 creates a thrust bearing that bears the flange 3$c$. Thus, during a cutting operation, thanks to the flange 3$c$ that cooperates with the end of the support structure 2, flexion stress borne in the load-bearing structure 3 for the insert 4 can be limited by being transmitted from the flange 3$c$ to the support structure 2.

As seen in FIGS. 7-10, the cartridge 1 ordinarily also includes one or more through-holes 14 or 14$bis$, for example in the area of the support structure 2, adapted so as to take means of attachment for the cartridge 1 on the boring bar 13, such as bolts 12 or screws. Preferentially, these means of attachment may comprise one or more bolts 12 or screws designed to cooperate with specially-adapted blind holes in the boring bar 13 (see FIG. 10), the blind holes ordinarily being internally threaded to mate with threads of bolts 12. Furthermore, additionally, one or two or all of the through-holes 14, 14$bis$ may have an oblong shape 14$bis$ as seen in FIGS. 8-8$bis$. The oblong through-hole or through-holes 14$bis$ has/have an oblong orifice as seen for example in FIG. 8-8$bis$. This particular oblong shape of the hole or holes 14$bis$ allows for the calibration or adjustment of the attachment of the cartridge 1 on the boring bar 13 along the longitudinal axis of the oblong orifice by loosening the bolts 12, moving the support structure 2 relative to the boring bar 13 along longitudinal axes of the holes 14*bis* to a desired position, and then securing the cartridge 1 relative to the boring bar 13 by tightening the bolts 12. The longitudinal axis of the oblong orifice or orifices is/are preferably parallel to a longitudinal axis of the cartridge 1. When the cartridge is mounted in the boring bar 13, the longitudinal axis of the orifice or orifices is/are preferably parallel to a longitudinal axis of the boring bar 13. When the cartridge 1 comprises two through-holes 14, 14*bis* through which corresponding bolts 12 extend, the bolts 12 can be received in corresponding holes in the boring bar 13. Longitudinal axes of the two through-holes 14, 14*bis* are preferably provided so that they are parallel to each other and parallel to the line extending perpendicular to axes of the corresponding holes in the boring bar 13. By providing two through-orifices 14 or 14*bis* and corresponding blind holes in this manner and sizing the lateral dimensions of the through-orifices 14 or 14*bis* perpendicular to the longitudinal axes of the through orifices 14 or 14*bis* to closely match external dimensions of the bolts 12 or other means of attachment, the direction in which the cartridge 1 can be moved relative to the boring bar 13 can be constrained by preventing pivoting of the cartridge 1 relative to the boring bar 13 and limiting movement of the cartridge 1 to the direction of a line extending perpendicular to longitudinal axes of the blind holes in which the bolts 12 will be received. The boring bar 13 can also be provided with an adjusting means arranged to co-operate with the support structure 2, said adjusting means being arranged for adjustment of the cartridge 1 along the longitudinal axis of the oblong orifice.

Figure 10:
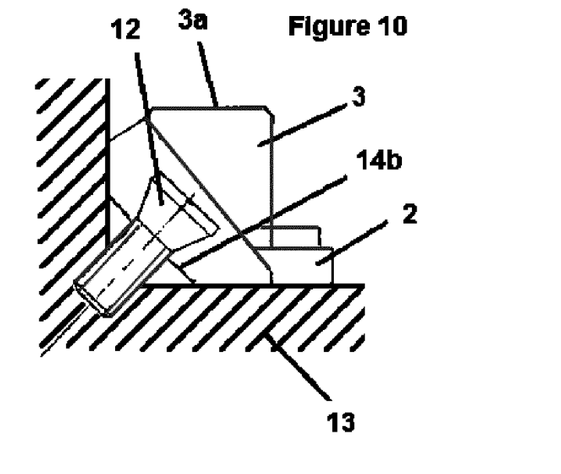
FIG. 10 is a schematic depiction of a cross-section of a means of attachment that grips a bevelled edge of the support structure 2 at one end of the cartridge opposite the one holding the cutting insert, in an example of the assembly of a cartridge according to FIG. 8.

According to an alternative or complementary construction, the support structure 2 has an edge or surface 14*b* as seen in FIGS. 5, 7 and 10, for example a bevelled edge or a bevelled surface, suitable to be gripped by a means of attachment, such as a bolt 12, designed to cooperate with specially-adapted blind holes in the boring bar 1, ordinarily thread to mate with threads of bolts 12 for the attachment of the cartridge 1 to the boring bar 13. Where the cartridge receiving seat of the boring bar 13 comprises an "L"-shaped surface having two surface branches and the cartridge 1 comprises a corresponding "L"-shaped surface having two surface branches for abutting against the two surface branches of the "L"-shaped surface of the cartridge receiving seat, the one or more through-holes 14, 14*bis* can be provided in the bevelled surface 14*b* of the support structure 2, the bevelled surface 14*b* defining a non-zero angle relative to the two surface branches of the "L"-shaped surface of the cartridge. Securing the support structure 2 relative to the boring bar 13 via through-orifices 14 or 14*bis* extending through the bevelled surface 14*b*, can facilitate avoiding unintended movement of the cartridge 1 along either branch of the "L"-shape of the support structure 2.

In addition, as seen in FIG. 7*bis*, the cartridge 1 may also include a surface, for example in the area of the support structure 2, that is suited to the positioning of a limiting item such as a bolt 15 or screw to limit the displacement of the wedge 5*b* and/or the head 8 and cooperative surface 10 of the bolt 7. This limiting item thereby forms a thrust bearing to block movement of the wedge 5*b* and/or head 8 and cooperative surface 10 of the bolt 7 in relation to the load-bearing structure 3. According to one construction example, the limiting item 15 comprises a screw assembled in cooperation with a dedicated orifice in the support structure 2.

Clearly, the invention is not limited to the embodiments described and depicted in the drawings appended. Modifications remain possible, particularly as regards the composition of the various items or the substitution of equivalent technology, without thereby departing from the scope of protection of the invention.

The invention claimed is:

1. An adjustable cartridge for a boring bar, comprising:
 a support structure including a surface arranged for abutment with a peripheral area of the boring bar;
 a load-bearing structure for mounting a cutting insert assembled to be movable transitionally in a first direction on the support structure;
 an adjustment mechanism arranged to adjust a position of the load-bearing structure in relation to the support structure, the adjustment mechanism including at least a first elastic means arranged to exert force against a first surface of the load-bearing structure, and an adjustment part disposed between the support structure and a second surface of the load-bearing structure, the adjustment part being arranged to contact the support structure and the second surface of the load-bearing structure, and to be movable translationally in a second direction relative to the support structure and the load-bearing structure, the adjustment part having a surface forming an acute angle with the second direction and being disposed in contact with the second surface of the load-bearing structure, the first surface and the second surface of the load-bearing structure facing in generally opposite directions; and
 means for fastening of the cartridge to the boring bar, the means for fastening of the cartridge being provided in the support structure.

2. The adjustable cartridge according to claim 1, wherein the second direction in which the adjustment part is movable translationally relative to the support structure is perpendicular to the first direction.

3. The adjustable cartridge according to claim 2, wherein the adjustment part is disposed between an adjustment part clamping means and a second elastic means, the second elastic means abutting a surface of the support structure.

4. The adjustable cartridge according to claim 3, wherein the second elastic means abutting the surface of the support structure includes at least one spring.

5. The adjustable cartridge according claim 3, wherein the adjustment part clamping means includes a clamping surface for abutting the adjustment part.

6. The adjustable cartridge according to claim 1, wherein the adjustment part is mounted on the support structure by a threaded pin that extends through the adjustment part.

7. The adjustable cartridge according to claim 1, wherein, from a side view of the cartridge, the support structure includes an "L"-shaped section so that an external face of a first branch of the "L" has an area forming a surface for abutment with the boring bar and a second branch of the "L" includes an assembly surface for supporting the adjustment part.

8. The adjustable cartridge according to claim 7, wherein the second branch of the "L"-shape of the support structure is arranged so as to be positioned in a plane parallel to a plane passing through a rotational axis of the boring bar.

9. The adjustable cartridge according to claim 1, wherein the load-bearing structure is mounted slidingly along at least one axial element of translation having a clamping surface and mounted on the support structure, the load-bearing structure interacting with the first elastic means positioned between the load-bearing structure and the clamping surface of the axial element of translation.

10. The adjustable cartridge according to claim 9, wherein the first elastic means positioned between the load-bearing structure and the clamping surface of the axial element of translation includes at least one Belleville spring washer.

11. The adjustable cartridge according to claim 9, wherein the load-bearing structure is mounted slidingly along a pair of axial elements of translation mounted parallel to one another.

12. A boring bar assembly, comprising:
a boring bar including a cartridge receiving seat; and
an adjustable cartridge according to claim 1, mounted in the cartridge receiving seat.

13. The boring bar assembly according to claim 12, wherein the cartridge includes one or more through-holes and the boring bar assembly includes one or more bolts arranged to extend through the one or more through-holes and be received in holes in the boring bar to clamp the cartridge relative to the cartridge receiving seat, wherein the one or more through-holes are oblong and permit the cartridge to be clamped by the one or more bolts relative to the cartridge receiving seat over a range of positions.

14. The boring bar assembly according to claim 13, wherein the cartridge includes two through-holes through which corresponding bolts extend and are received in corresponding holes in the boring bar, longitudinal axes of orifices of the two through-holes being parallel to each other and parallel to a line extending perpendicular to axes of the corresponding holes in the boring bar.

* * * * *